United States Patent [19]

Kitaue

[11] Patent Number: 5,120,057
[45] Date of Patent: Jun. 9, 1992

[54] HAND HELD VIDEO GAME WITH SIMULATED BATTLE AGAINST ALIENS

[75] Inventor: Kazumi Kitaue, Kobeshi, Japan
[73] Assignee: Konami Co., Ltd., Kobe, Japan
[21] Appl. No.: 471,094
[22] Filed: Jan. 26, 1990
[51] Int. Cl.[5] .......................... A63B 67/00; A63F 7/06
[52] U.S. Cl. .................................... 273/85 G; 273/433
[58] Field of Search .................... 273/85 G, 433, 434

[56] References Cited

U.S. PATENT DOCUMENTS

| | | |
|---|---|---|
| 4,403,216 | 9/1983 | Yokoi . |
| 4,415,153 | 11/1983 | Yokoi . |
| 4,424,967 | 1/1984 | Yokoi . |
| 4,438,926 | 3/1984 | Yokoi et al. . |
| 4,542,903 | 9/1985 | Yokoi et al. . |
| 4,582,322 | 4/1986 | Yokoi et al. . |
| 4,582,323 | 4/1986 | Minkoff et al. ............... 273/85 G |
| 4,895,376 | 1/1990 | Shiung-Fei ................... 273/85 G |

OTHER PUBLICATIONS

Xerographic copy of hand-holdable LCD game device and back side of associated packaging—Electronic Football.
Xerographic copy of hand-holdable LCD game device and back side of associated packaging—Electronic Baseball.
Xerographic copy of hand-holdable LCD game device and back side of associated packaging—Double Dragon.

Primary Examiner—William H. Grieb
Assistant Examiner—Jessica J. Harrison
Attorney, Agent, or Firm—Welsh & Katz, Ltd.

[57] ABSTRACT

A novel hand held electronic LCD video game with four individually displayable player controlled figures controlled by the player to defend against alien attackers and to attack a fortress. A game processor controls display of player and game controlled image segments to simulate movement of alien creatures attacking the player controlled soldier. Five alien fortress areas must be overcome by the player and limited time is available to overcome each area. The player must manipulate the player controlled image to one of the four positions to avoid destruction from pseudo-random attack by alien missiles while firing a weapon to destroy alien soldiers attacking in a pseudo-random pattern among four routes.

1 Claim, 8 Drawing Sheets

HAND HELD VIDEO GAME WITH SIMULATED BATTLE AGAINST ALIENS

The present invention relates generally to the field of electronic games and more particularly to a novel hand held electronic video game.

The advent of video display devices such as liquid crystal displays (LCD) employed in electronic games has led to the development of hand held electronic video games which can be held in the player's hands while allowing the player to manipulate the controls and observe a video display. Such electronic games are know in which a player causes the movement of a games object such as a dart, horseshoe, or ping pong ball. The movement of the game object can be influenced by the player. Some prior art games permit changing of the movement of the game object in a manner unknown to or not easily predictable by a player with reference to predetermined positional relationships between player controlled and games controlled symbols. Also, games are known in which a game object may be manipulated by a player to try to avoid randomly generated obstacles.

It is accordingly an object of the present invention to provide a novel video game suitable for hand held play using an LCD video display.

It is another object of the invention to provide a figure displaying electronic hand held game apparatus with which a novel game can be played.

It is another object of the present invention to provide a novel electronic hand held game apparatus having individually displayable player-controlled figures manipulatable by the player to defend against attack by game-controlled figures attacking in an unknown pattern and to attack an enemy fortress.

Accordingly, in accordance with one embodiment of the invention, there is provided a hand-held image displaying electronic game apparatus including a plurality of manually operable control switches for permitting control of the play of the game by a player, a sound transducer for generating sound, and a control circuit coupled to the control switches and the sound transducer, and including a processor, a read-only memory, and a random access memory, for generating game control signals and sound signals. Also included is an LCD display having selectively activatable image segments corresponding to player-controlled figures, game-controlled figures, and alpha-numeric game information for selective display thereof. The display provides for display of game images responsive to the game control signals such that the player-controlled figure is visually displayed at one of a plurality of pre-determined positions and the position at which the player-controlled figure is displayed is moveable to an adjacent position responsive to player activation of a control switch. In addition, a plurality of game-controlled figures are sequentially visually displayed in pseudo-random sequences to give the appearance of a random pattern of attack by the game-controlled figures toward the player-controlled figure.

BRIEF DESCRIPTION OF THE DRAWINGS

The invention, together with further objects and advantages thereof, may be understood by reference to the following detailed description taken in conjunction with the accompanying drawings wherein like reference numerals designate like elements throughout several figures.

DETAILED DESCRIPTION OF THE PREFERRED EMBODIMENT

Figure 1:
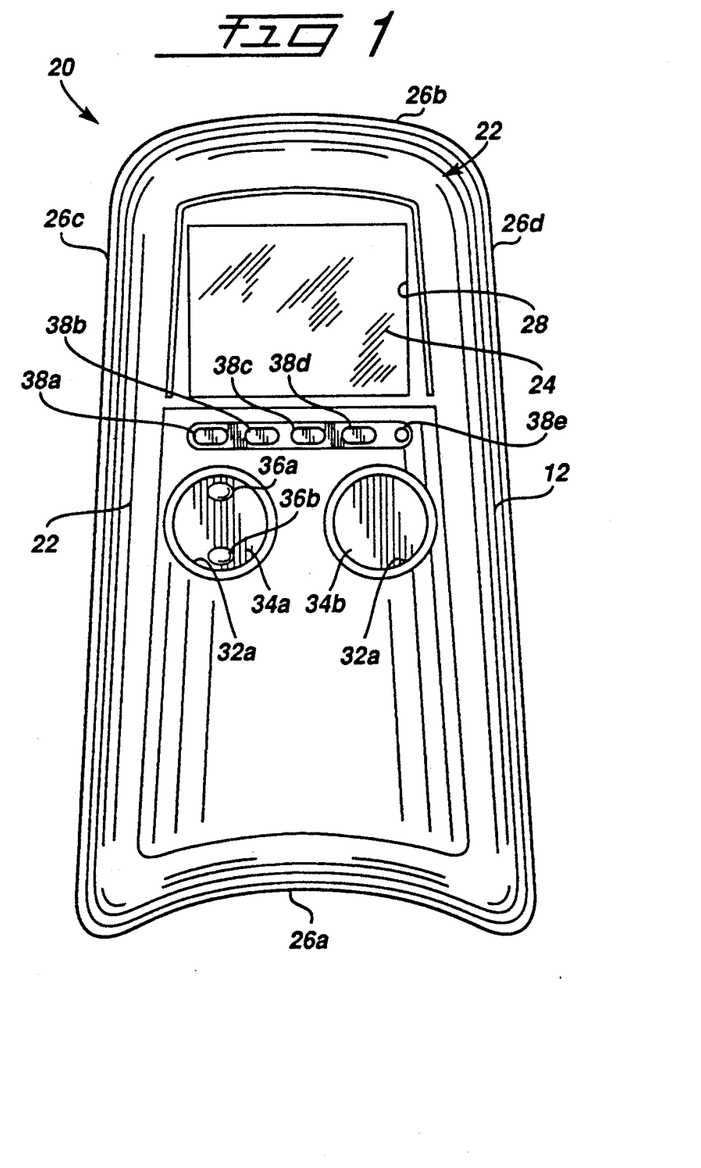
FIG. 1 is a front elevational view of a housing for a specific embodiment of a hand held electronic LCD video game constructed in accordance with the invention.

Referring now to the drawings, FIG. 1 is a front view of a hand held game 20 in accordance with the present invention comprising a casing 22 configured for housing various electronic components and a display 24. The casing 22 has a generally trapezoidal configuration, as shown in FIG. 1, defined by a bottom peripheral edge surface 26a formed as a concave arcuate edge surface, a top edge surface 26b formed as a convex arcuate surface and generally longitudinally rectilinear lateral edge surfaces 26c and 26d. The laterally opposite ends or corners of the bottom and top arcuate edge surfaces 26a and 26b, respectively, blend with the lateral edge surfaces 26c and 26d through rounded corner edge surfaces, as shown. Casing 22 in the illustrated embodiment is approximately 7 inches long, 4½ inches wide at the bottom end, and 3¼ inches wide at the top end. The casing 22 is preferably formed of a suitable rigid plastic material to contain and protect the game electronic circuitry.

The casing 22 has a generally rectangular opening 28 behind which may be mounted the display screen 24 suitably observable in the opening 28. In the illustrated embodiment, the display 24 is a liquid crystal display (LCD) screen, but may alternatively employ another type of display screen suitable for a hand held game such as electroluminescent, electrochromic, etc. The display screen 24, as will be described in greater detail hereinafter, is formed with segments for displaying images for the game, as well as numerical value and other game information displaying portions for displaying game scores and other game-related information.

In addition, various pushbuttons for control of the game, such as control of the visual display of the game images when playing the game, are provided in the vicinity of the display opening 28 of the casing 22. In the illustrated embodiment, the casing 22 has a pair of circular openings 32a within which may be supported control buttons 34a and 34b, respectively, forming part of the video display control circuitry. Circular buttons 34a and 34b may optionally be of equal diameter and symmetrically located about the longitudinal center line of the casing 22, as shown. In the illustrated embodiment, the button 34a activates a dual switch (i.e., two pushbutton switches) with two activation positions indicated by circular regions 36a and 36b (i.e., circular "bumps" in the illustrated embodiment) which may be manually manipulated by the player to control, for example, the up and down movement (i.e., up if the upper position 36a is depressed, and down if the lower position 36b is depressed) of a player controlled figure, to be described in detail hereinafter. The button 34b, in the illustrated embodiment, may be manually manipulated by the player to control simulated firing of a weapon on the display screen 24 as will be described in detail hereinafter.

A plurality of generally equal oblong openings to receive pushbutton controls 38a, 38b, 38c and 38d and a smaller round opening to receive a pushbutton control 38e may also be formed in the casing 22 such that there axis lie along a common line transverse to the longitudinal access of the housing 10, as shown. The pushbuttons 38a, 38b, 38c, 38d, and 38e facilitate selective control of switches which control aspects of the electronic circuitry of the video game 20.

In the illustrated embodiment, the pushbutton 38a controls an off switch to permit the player to turn the game off and the pushbutton 38d controls an on switch which permits the player to turn the game on and to control the start of the game play. The pushbutton 38b controls a sound control switch which allows the player to turn game sounds on and off. In the illustrated embodiment, the pushbutton 38c is not used while the pushbutton 38e controls a reset switch for resetting the game after inserting batteries.

Figure 2A:
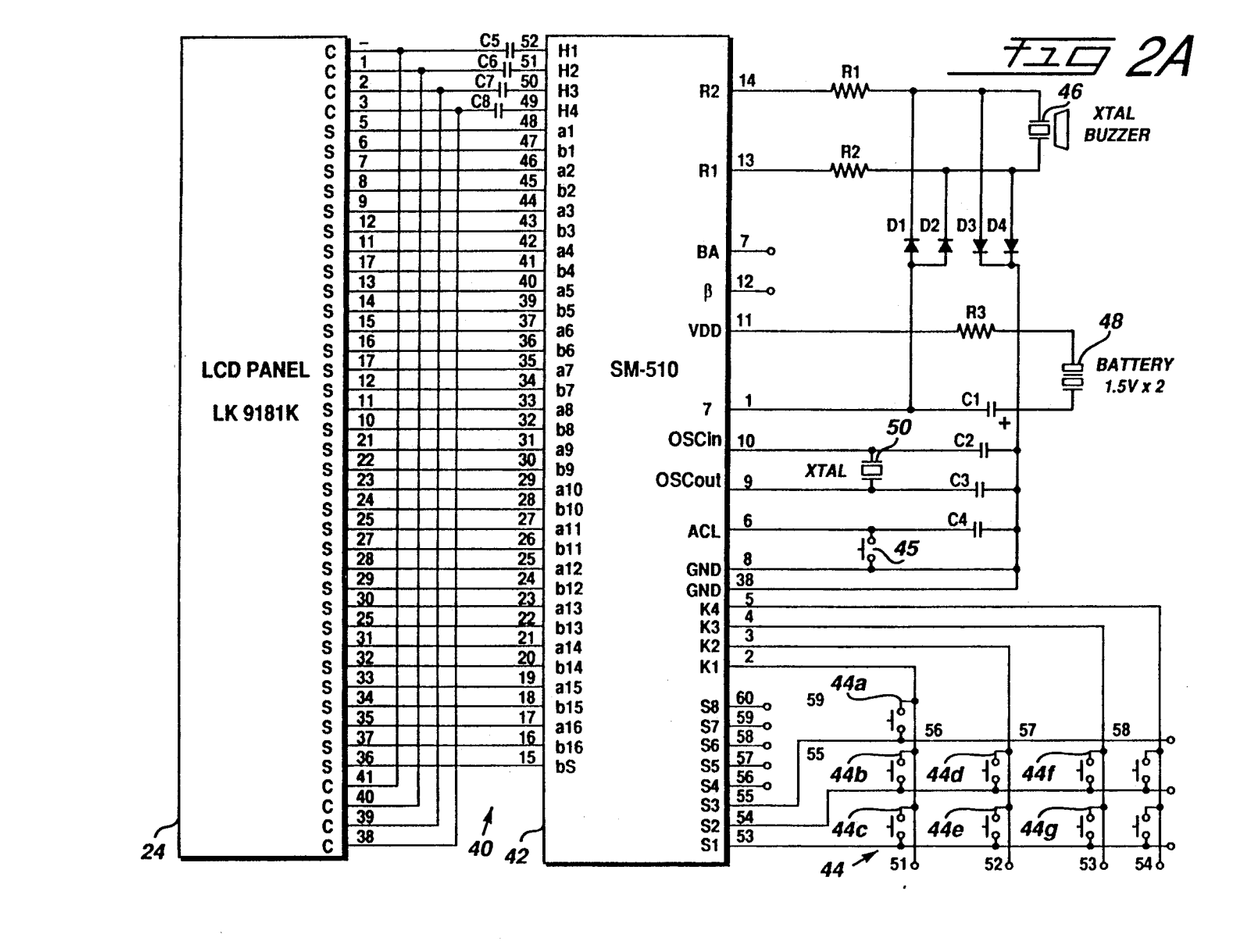
FIG. 2A is a block diagram of the electronics of a specific embodiment of a hand held LCD video game in accordance with the invention.

FIG. 2a is a block diagram illustrating a specific embodiment of the internal electronic circuitry 40 of the hand-held game 20. The electronic circuitry 40 includes the LCD display screen 24 (e.g., an LH9181K LCD display marketed by Sharp) coupled to a game processor 42 (e.g., an SM-510 marketed by Sharp) as shown. The game processor 42 controls the game display 24 by controlling LCD image segments of the game display 24, and also controls game sound outputs, both responsive to the pushbutton switch control inputs. A set of 8 pushbutton switches 44a-g and 45 is coupled to the game processor to provide control inputs. In the illustrated embodiment, two switches are shown unused, and the rest correspond to the control pushbuttons 34a, 34b, 38a-38e of FIG. 1. For example, switches 44a and 44b may correspond to pushbutton 34a (i.e., pushbutton regions 36a, and 36b), switch 44c may correspond to pushbutton 34b, switches 44d-44g may correspond to pushbuttons 38a-38d, and switch 45 may correspond to reset pushbutton 38e. A crystal sound transducer 46 is coupled, as shown, to the processor 42 to generate game sounds responsive to sound signals generated by the processor 42. A battery 48, which provides, electrical power for the circuitry 40, and an oscillator crystal 50 for use in generating clock signals in conjunction with associated capacitors is also coupled, as shown, to the processor 42.

Figure 2B:
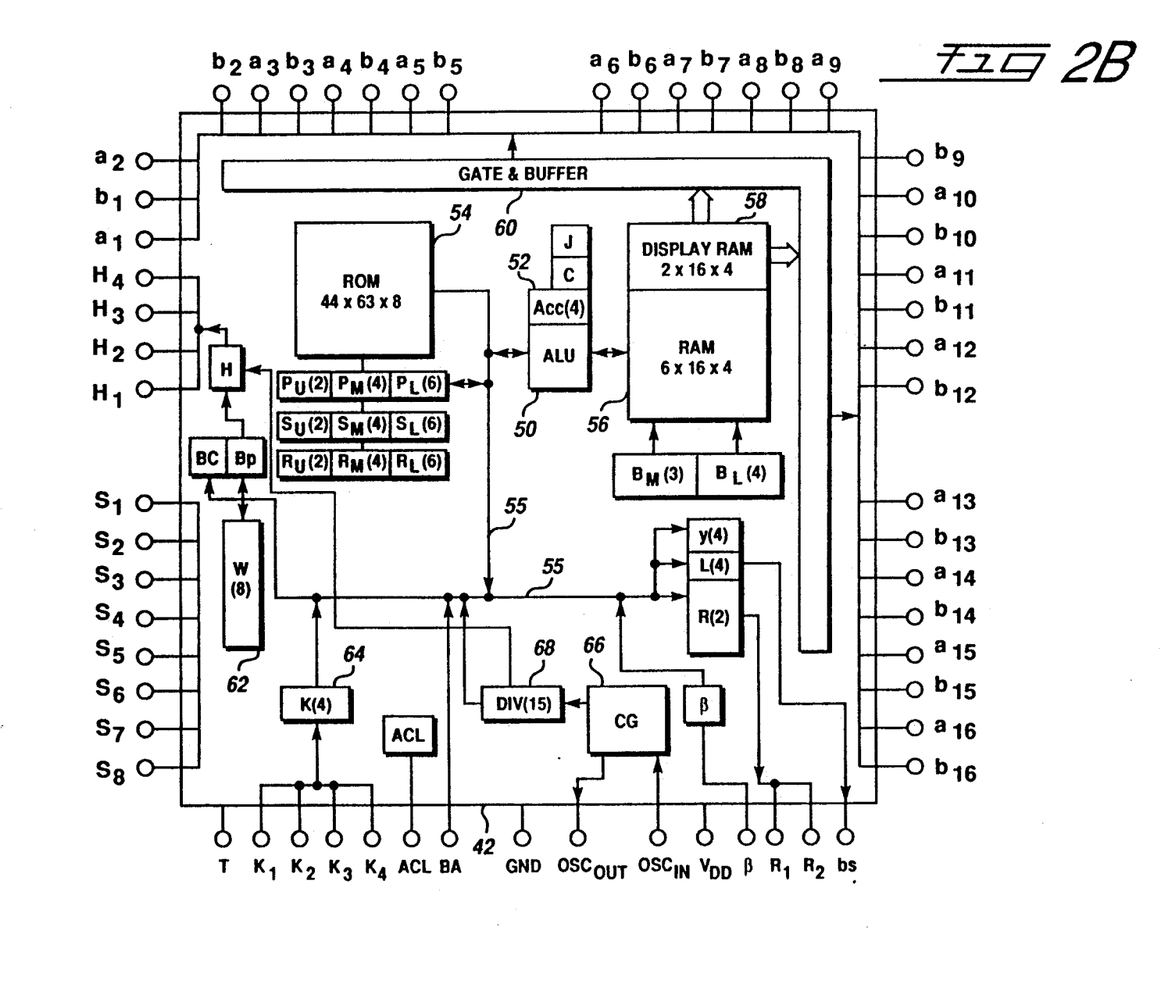
FIG. 2B is a detailed block diagram of a specific embodiment of the processor for the hand held LCD video game of FIG. 2A.

Referring now to FIG. 2B, there is shown a detailed block diagram of a specific embodiment of the game processor 42 with pin designations corresponding to those shown in FIG. 2A. The processor 42 comprises an arithmetic logic unit (ALU) 50 and associated registers 52 coupled along with a read only memory (ROM) 54 to a central bus 55. A random access memory (RAM) 56 including a display RAM 58 is coupled directly to the ALU 50 and to a gate and buffer circuit 60, as shown. The gate and buffer circuit couples display segment control signals to the segment control outputs $a_1$-$a_{16}$ and $b_1$-$b_{16}$, as shown. The control switch inputs $S_1$-$S_8$ and $K_1$-$K_4$ are coupled respectively through interface buffers 62, 64 to the ALU 50 through the bus 55. In addition, a clock signal circuit 66 couples clock signals to the bus 55 through a divider 68.

The processor 42 generates image segment control signals and sound signals by processing the control switch inputs responsive to a game program stored in the ROM 54 utilizing the RAM 56 for temporary storage. The ROM 54 stores the game program and stores the data needed for controlling the image segments of the display 24. The display RAM stores the current image segment control data, which is coupled to the display to control the game images.

Figure 3:
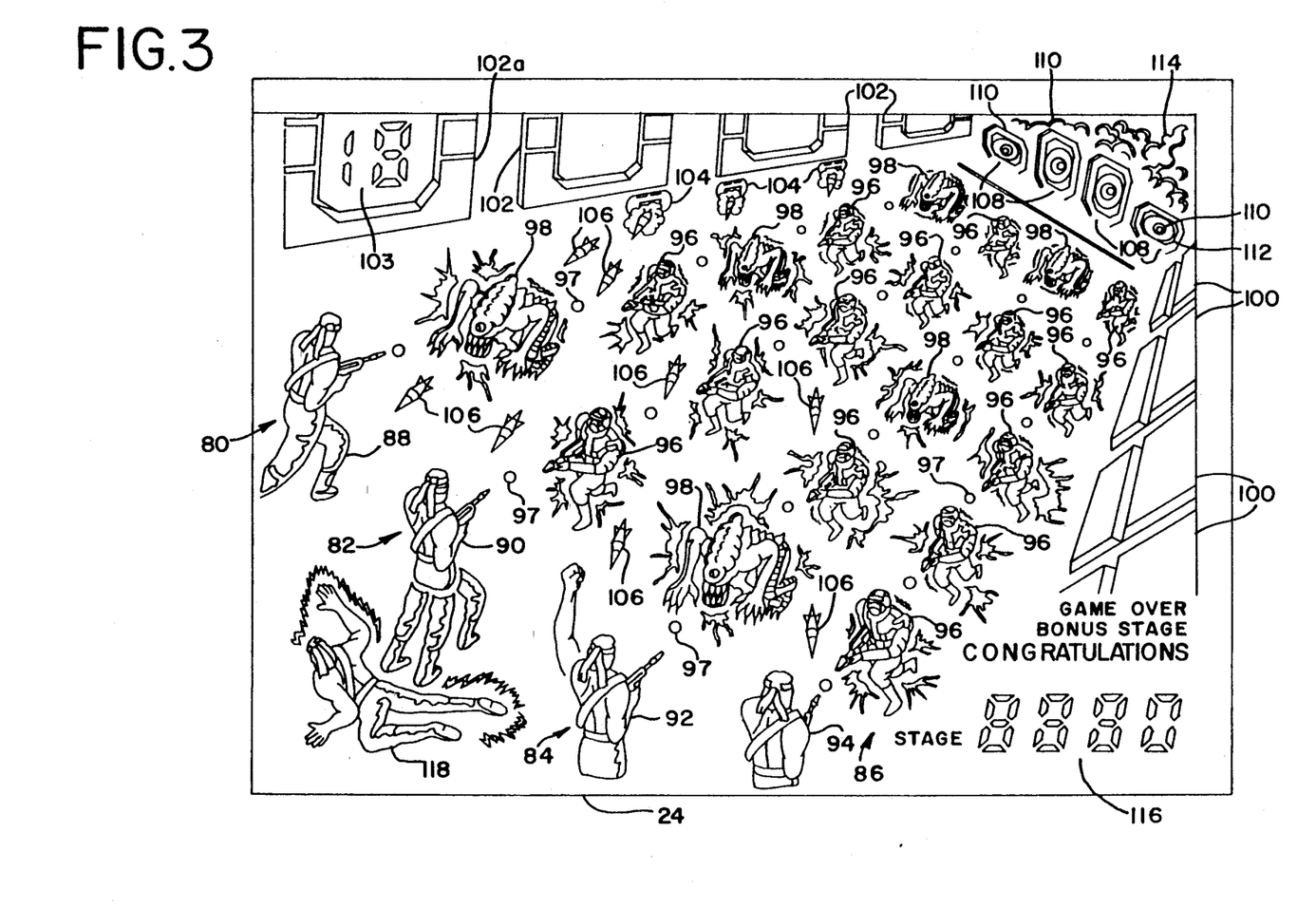
FIG. 3 is a diagrammatic view illustrating a specific embodiment of a detailed pattern for a display of the embodiment of FIG. 1.

FIG. 3 is an illustration of a specific embodiment of a display pattern made up of selectively activatable images or image segments for the display 24, each of which when activated become visually displayed. The game displayed by the image display screen 24 of the illustrated embodiment is a game in which an image of a player controlled figure (a contra) carrying a weapon (e.g., a machine gun) fires the weapon to destroy enemy aliens and alien creatures at an alien fortress. The player must progress through 5 levels or areas of the fortress in order to destroy all of the alien fortress.

The display 24 comprises selectively activatable figures (i.e., image segments), including 4 columns, 80-86 of player and game-controlled figures extending diagonally from the lower left to the upper right. Each of these columns 80-86 comprises a player controlled figure (contra) 88-94 at the lower left end while the rest of each column 82 and 86 comprise a series of 5 alien FIGS. 96 extending from the lower left to the upper right of the display 24, as shown. Columns 80 and 84 comprise alternating figures of aliens 96 and alien creatures 98. Each of the aliens 96 and alien creatures 98 are surrounded by an explosion indicating image segment which when displayed simulates destruction of the associated alien or alien creature. In all columns 80-86, the alien figures increase in size from upper right to lower left. A set of "bullet" image segments 97 comprising five round bullets are arranged along a line in each column 80-86, as shown. An image segment of a prone player controlled FIG. 118 indicates a dead or destroyed player controlled image is located at the lower left corner of the display 24.

Along the right side of the display 24, are arranged a series of four wall segments 100, and along the top of the display 24 are arranged a series of four wall segments 102, 102a. Within the wall segment 102a are two digits of a countdown gauge 103, as shown. Below the wall segments 102 are configured artillery batteries 104 which fire artillery shells. Four series of artillery shell FIGS. 106 are configured along lines aligned with the four contra-FIGS. 88-94 and the artillery batteries 104, as shown. At the upper right corner of the display are located image segments of four sensors 108, one at the end of each column 80-86, comprising a sensor 110 and a shutter 112. Explosion indicating image segments 114 are arranged over the sensors 108. In the lower right corner of the display 24 is a four-digit, eight-segment digital display 116. Above the digital display 116, alphanumeric segments of "game over", "bonus stage", and "congratulations" are provided as game information.

During play of the game, only one of the player-controlled images 88-94 is visually displayed at any time. The player may move the displayed player-controlled image by activating the left control pushbutton 34a. Thus, by pushing on the button position 36a, the player image directly above the previously displayed image is displayed, simulating upward movement, while pushing on the pushbutton region 36b causes simulated movement downward on the display 24. Activation of the control pushbutton 34b momentarily visually displays a succession of bullet images 97 which are in line with the currently displayed player control image, thereby simulating firing of the weapon of the player-controlled image. Thus, the player-controlled images 88–94 may be manipulated by moving them to one of four positions 88–94 and by firing the associated weapon, using pushbuttons 34a and 34b respectively.

Simulated movement of the aliens 96 and alien creatures 98 is provided under control of the game electronic processor 42 by visual display of one image at a time in a sequence. Thus, an alien 96 or alien creature 98 is caused to appear to advance towards the lower left of the display 24 (i.e., generally toward the player controlled image) by sequentially displaying (i.e., scrolling) images generally from the upper right to the lower left of the display 24. Similarly, missiles 106 are sequentially displayed along a line to simulate flight toward a player controlled image. The alien soldiers approach and the missile are fired in a psuedo-random pattern (i.e., a pattern substantially unknown to the player). The wall segments 100, 102, 102a are also displayed sequentially (i.e., scrolled) during game play to simulate motion.

Figure 4A:
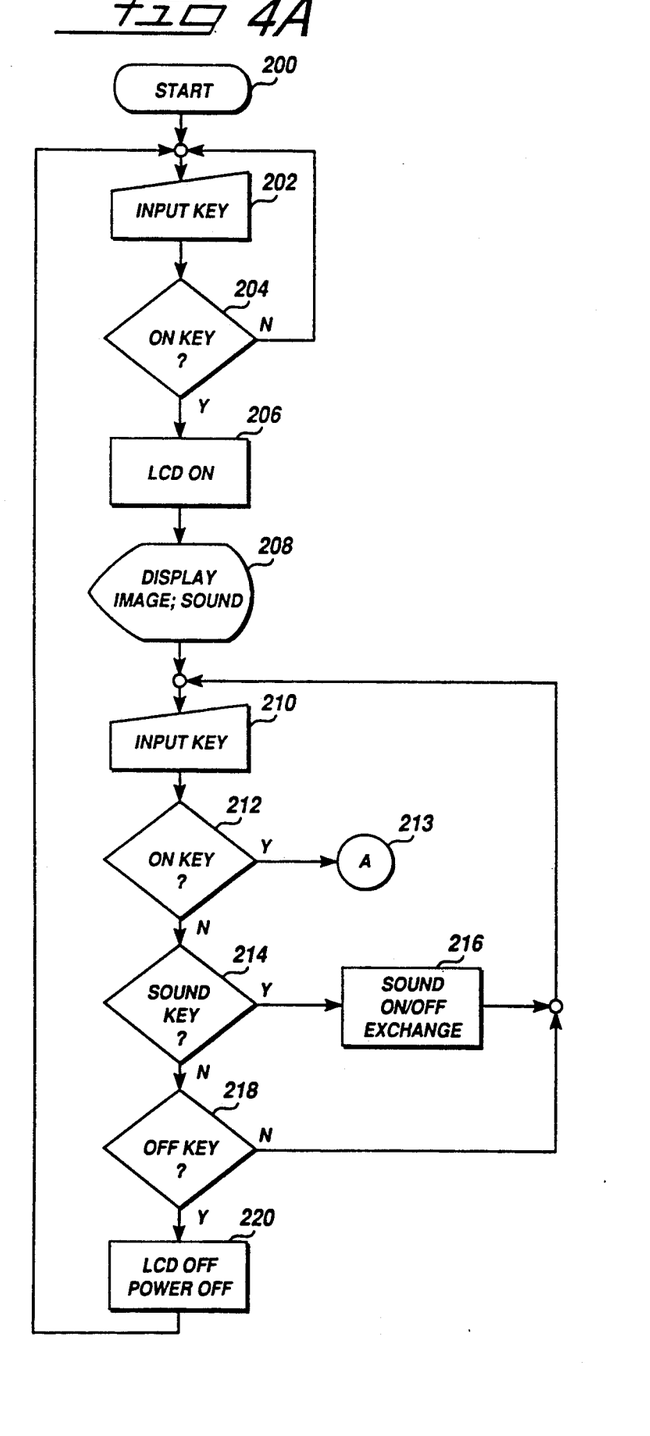
FIG. 4A-4D are flow diagrams illustrating the game control sequence and game play methodology of a specific embodiment of a control program for the game processor 42 according to the invention.

The game is initiated, as shown by blocks 200, 202 and 204 of FIG. 4A, by pushing the power on pushbutton (i.e., key) 38d which activates the display 24 to display one of the player controlled images 88–94 and will generate a game sound sequence, as shown at blocks 206 and 208. Game play is begun, as shown at blocks 210 and 212, by pushing the power-on key 38d a second time. This results in branching to the routine of FIG. 4B as illustrated at branch point 212. If the game play is not initiated at block 212 by activating the on key, program control continues to the decision block 214. As illustrated by blocks 214 and 216, the sound may be deactivated so that the game is silent by depressing the sound on/off key 38b or can be reactivated by depressing the sound on/off key 38b again. As illustrated at blocks 218 and 220, the game may be turned off at any time by depressing the power off key 38a where upon the game sequence returns to block 202 to the restart of the game, as shown.

Figure 4B:
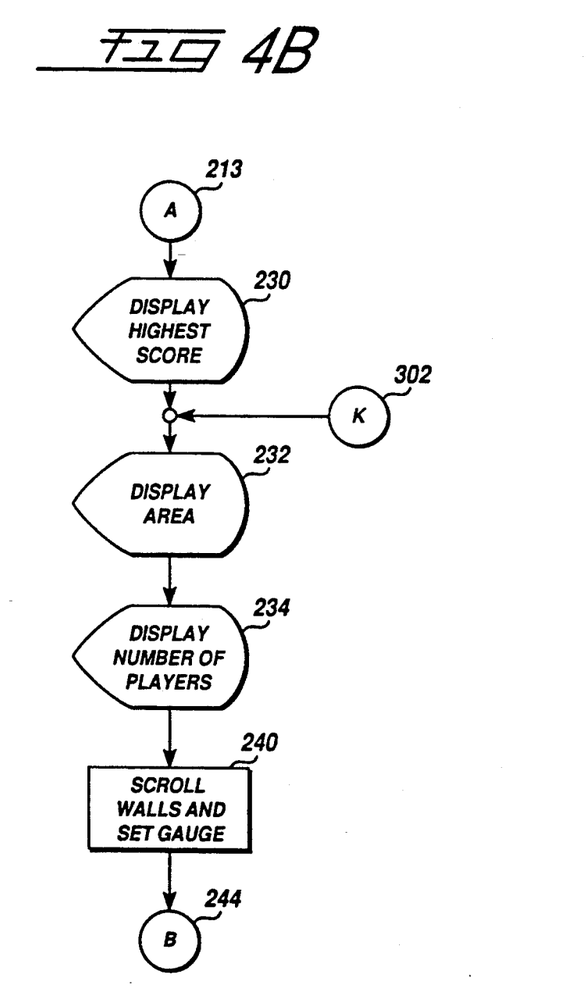

A second depression of the power on key 38d, as illustrated at block 212, will result in branching to FIG. 4B, as shown at block 213. As illustrated at block 230 of FIG. 4B, the second depression of the on key activates the display of the previous highest score for several seconds on the digital display 116 along with a sound sequence, as shown at block 230. This is followed by display of "A-1" indicating the area of the fortress that the player is in (i.e., the first area of the fortress) for several seconds along with a beep, as illustrated at block 232. This is followed by display of "P-3", along with a beep, indicating the number of remaining operator-controlled players (e.g., three in this instance) allocated for the game, as illustrated at block 234. Each game begins with an allocation of three operator-controlled players. If all three players are destroyed, the game is over.

The wall segments 100, 102, 102a then begin to scroll toward the operator-controlled image and the enemy aliens attack the operator-controlled image by scrolling (i.e., simulated movement by sequentially displaying images) forward from upper left to lower right in the display 24. The numeric gauge display 103 sets a gauge number which counts down to zero for each area and the scrolling of the wall segments 101, 102 begins, as shown at block 240. The gauge number for area 1 is 15, for area 2 is 16, for area 3 is 17, for area 4 is 18, and for area 5 is 19 in the illustrated embodiment. The value of the gauge display indicates the depth of the area, and is incremented by one each two times the walls are scrolled. Thus, the number is reduced to indicate that the player-controlled image is approaching the citadel sensors 108.

Figure 4C:
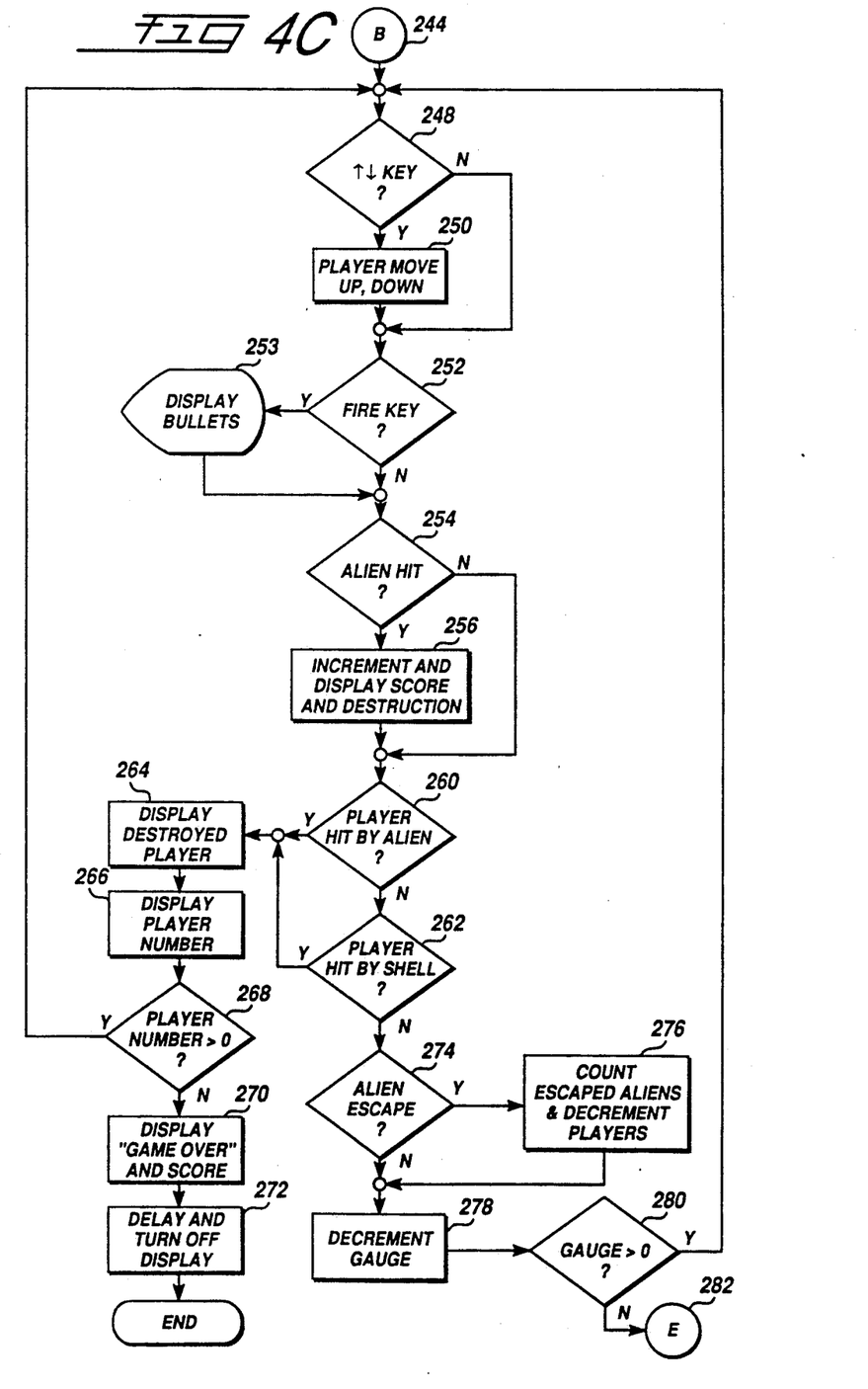

As illustrated, game play proceeds from branch point 244 to blocks 248 and 250 of FIG. 4C, where the player may manipulate the controls 34a to avoid attack of the aliens by pushing the up key region 36a of key 34a or the down key region 36b of the key 34a, as indicated by blocks 248 and 250. The player symbol may also be manipulated by firing the player weapon by pushing the firing key 34b as indicated by blocks 252, 253. As illustrated by blocks 254 and 256, if the alien soldier is hit by a bullet fired by the player symbol, the players score is incremented by ten, and if an alien creature is hit, the score is incremented by 50. If a score of 1500 is exceeded, a player is added to the operator's total players for the game. The score is continually displayed during the game play and when an alien soldier or alien creature is destroyed, a destruction image is temporarily displayed and the destroyed symbol is removed, as indicated by block 256.

If the player fails to hit an approaching alien symbol, and fails to move out of the way, the player controlled symbol may be hit (i.e., run into) by the alien. The player controller symbol may also be hit by an artillery missile. If either event occurs, the player controlled symbol is shown as destroyed by displaying the destroyed player symbol 118 and removing the player controlled symbol temporarily from the screen, as illustrated by blocks 260, 262 and 264. The number of remaining player controlled symbols in the game is then displayed, as shown at block 266, and if players remain, the player sequence continues to block 248, as shown. If no players remain, the game score is displayed, the "GAME OVER" message is displayed with a sound sequence and the display is turned off after a few seconds, as illustrated by blocks 268, 270 and 272. If there are players remaining at block 268, the player symbol is displayed and the game sequence returns to block 248, as shown.

Figure 4D:
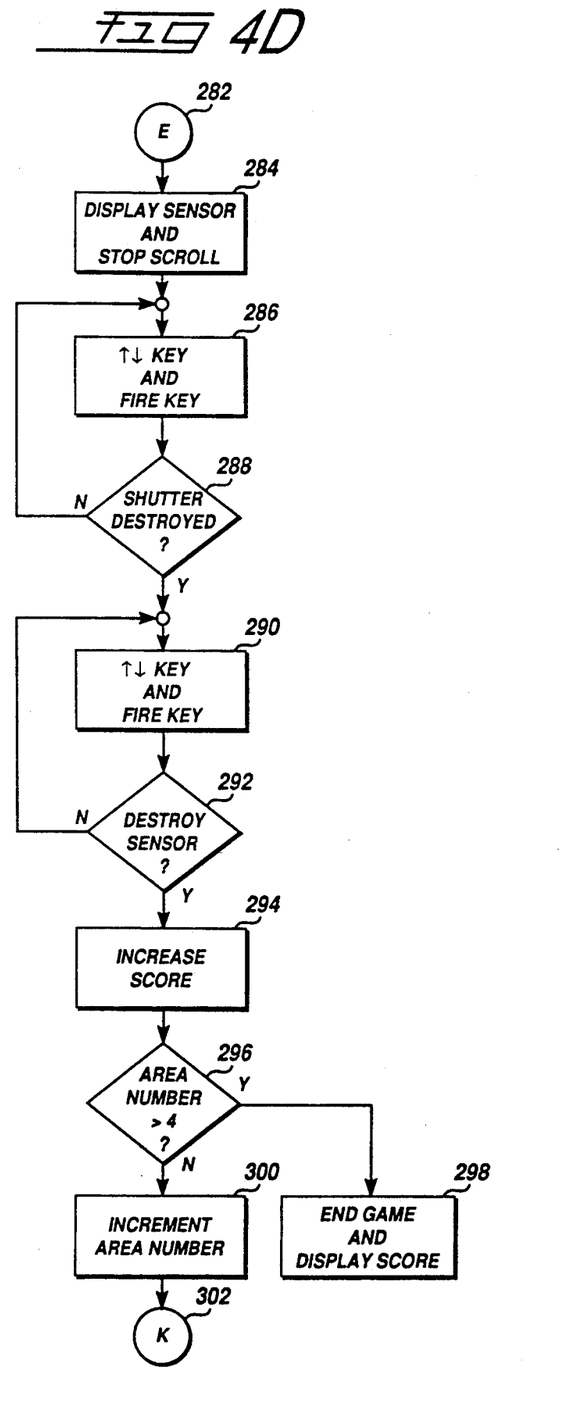

If the result at block 262 is that the game-controlled image is not hit, then, if an alien has escaped by passing the player symbol, the aliens that escaped are counted, and if ten escape, the number of players available is decreased by one, as shown at blocks 274 and 276. As illustrated by block 278, the gauge display is then decremented every two scrolls of the wall segments (i.e., in the illustrated embodiment, every eight seconds). Thus, the time allotted to get through the first area is 128 seconds. The gauge is checked to determine if it is greater than zero as indicated at block 280, and if it is greater than zero, the game sequence continues returning to block 248, as shown. If the gauge has counted down to zero, the game sequence branches to FIG. 4D, as shown by the node 282 and one or more of the citadel sensors 108 are displayed and the wall scrolling stops, as shown by block 284. This indicates that the player has entered the citadel of the area the player is in. The player then manipulates the player controlled symbol to fire at the shutter of the sensor, as shown at block 286. If the shutter is not hit enough times to destroy, the game sequence continues by return to block 286, and if it is destroyed, the game controlled symbol is manipulated to fire at the sensor as illustrated by block 288 and 290. If the sensor is not hit enough times to destroy it, the game sequence continues, and if the sensor is destroyed, the player score is incremented (i.e., in the illustrated embodiment 100 points for destroying the sensors) as illustrated at block 292 and 294. Subsequently, if the fifth area has been conquered, the game ends, the score is displayed, the "GAME OVER" and "CONGRATULATIONS" messages are displayed, as shown by blocks 296 and 298. If the area 5 has not yet been conquered, the game sequence continues by incrementing the area number, except after the second and fourth area when a bonus stage occurs, and the game sequence returns to block 232 of FIG. 4B, as indicated by blocks 300 and node 302.

The game may also be played by two players by selecting a two player mode after the first power on step. This selection is performed by pushbutton 38C after which "2P" is displayed. The on key is then pressed to start the game as indicated by block 212 of FIG. 4A and "1P" is displayed and the normal game sequence then begins as shown at node 213 of FIG. 4A and FIG. 4B until player one has lost one player symbol or the first area is cleared. The second player then depresses the on key to start the sequence for the second player at node 213 until the second player looses a player symbol or clears the area. This sequence continues until the game is over.

In progressing from area one through area five during the game, the degree of difficulty increase's. In addition, after clearing Areas two and four, a bonus stage is provided. For area 1, the gauge starts at fifteen and counts down to zero, and there are only alien soldiers advancing at the relatively slow pace of the wall partition scrolling. The alien soldiers can go straight, but also appear, at random moments, to move in oblique patterns from one column to another. This random oblique movement makes it more difficulty to destroy the alien soldiers. When the area has been conquered, and the gauge is at zero, one sensor with a shutter will appear on the citadel wall, and the alien soldiers and alien creatures will disappear. The shutter for the area 1 sensor can be destroyed by one bullet and the sensor itself, which is exposed by the loss of the shutter, takes two bullets to destroy.

Area two begins with a gauge number of 16 permitting 136 seconds to clear the area and reach the sensor. Only alien soldiers attack, but in randomly oblique patterns moving from column to column as they approach the player controlled image with half of them moving faster than the wall scroll speed and half moving at the wall scroll speed. When area two is cleared, two sensors are displayed, and each shutter requires two bullets to destroy it and each sensor may be destroyed by three bullets.

A first bonus stage occurs after Area two is conquered with a gauge number of 15, providing a 128 second period. Only alien soldiers attack during the bonus stage which permits earning score points by destroying the alien soldiers when no sensor appears when complete and players are not lost if alien soldiers escape.

After the bonus stage, Area three begins with the gauge number set to 17 providing a 144 second period. Both alien soldiers and alien creatures attack the player controlled symbol in this area in straight or randomly oblique patterns. The alien soldiers advance faster than the alien creatures and both are faster than the wall scroll speed. When Area three is cleared and the gauge is zero, three sensors are displayed on the citadel. Each sensor shutter requires 3 bullets to destroy and each sensor exposed requires 3 bullets to destroy.

Area four begins with the gauge number set to 18 providing a 152 second period. Both alien soldiers and alien creatures attack the player controlled image with straight or randomly oblique patterns and faster than for the Area three. In addition, the three artillary batteries, which are indestructible, randomly fire missiles at the player controlled image (i.e., at intervals of 8-15 seconds). In each case, the process generates the appearance of random pattern of attack for the missiles and the aliens. When the Area four is cleared, three sensors are displayed, but they have indestructible shutters which open and close. Thus the sensors can be destroyed by four bullets but they must be timed to hit when the shutter is open.

A second bonus stage is provided after destroying Area four, and begins with the gauge number set to 15 providing 128 seconds and with both alien soldiers and alien creatures attacking the player controller image moving similar to Area four. Three sensors are displayed after four seconds and may be destroyed by four bullets to open the shutter and four bullets to demolish the sensor. The bonus period ends when the gauge counts down to zero.

The Area five begins after the bonus stage 2 with the setting of the gauge number to 19 providing 160 seconds of play. Both alien soldiers and alien creatures attack of player controlled image and the artillery batteries also fire missiles. As in previous areas, the aliens attack in straight, oblique or jigzag patterns that appear random and the artillery batteries sometimes launch two missiles at once. The speed of aliens and missile firing is faster than for Area four. When the area is cleared, four sensors are displayed and each has an indestructible shutter which is opened and closed periodically. Each sensor can be destroyed by five bullets timed to hit the sensor when the shutter is open.

A specific program listing for use with the illustrated embodiment in which the SM-510 processor is used is shown in Appendix A. The program shown is a hexadecimal object code listing having a hexadecimal program address on the left followed by a hexadecimal representation of the object code. The program includes both image segment control and sound generation code.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

Specific embodiments of the novel electronic handheld video game according to the invention have been described for purposes of illustrating the manner in which the invention may be made and used. It should be understood that implementation of other variations and modifications of the invention in its various aspects will be apparent to those skilled in the art, and that the invention is not limited by the specific embodiments described. It is therefore contemplated to cover by the present invention any and all underlying modifications, variations or equivalents that fall within the true scope of the basic underlying principles disclosed and claimed herein.

APPENDIX A

```
*                 BH002     C (Contra)                                    *
*                           prog                                          *
*                           ROM addr 0000H thru 0FFFH                     *
*                                       By   KONAMI                       *
*-------------------------------------------------------------------------*
* addr    0  1  2  3  4  5  6  7  8  9  A  B  C  D  E  F                  *
*-------------------------------------------------------------------------*
*
<0000>  7F 80 71 0E 90 7C 5F 60 90 54 5F 30 E3 40 0E 4B
<0010>  5F 33 61 5F 04 1F 60 25 32 61 78 32 F9 5F 76 78
<0020>  B2 4  61 31 79 6E 90 7F 13 1A 7A 74 30 B6 7B F7
<0030>  77 60 40 48 54 80 60 5F 77 7D 86 05 61 18 CA 00
<0040>  5F 00 00 B4 A9 00 56 21 18 0B A6 30 50 9D 5F 21
<0050>  61 66 30 64 5F 40 36 54 A2 5F 7E 1B 7F 10 5F 80
<0060>  40 5F 1B 54 09 5F 0B 55 9D 72 5F 86 56 1B 9D 5F
<0070>  BB AC AA 97 5F 5F A2 50 66 5F 7D 0B 18 18 09 00
<0080>  18 00 54 7F 00 6C 90 20 5F 00 D6 27 5F A3 9B
<0090>  71 1C 80 6E 00 00 70 5F 0C 11 90 6A FA 54 53 7C
<00A0>  5A B4 27 5F 15 79 59 6A D7 00 00 72 71 DA 6E 80
<00B0>  BC 6C 22 DA 5F 57 FA 78 6E 68 7B F7 69 22 40 00
<00C0>  5F 35 7E 20 5A 6E 11 63 68 50 0E 8C 68 20 6D 78
<00D0>  62 6E 6D 04 6E 4A 5A 7E 5A 6E 10 6D 76 62 F5 18
<00E0>  0D 10 AA 6D 4A 62 4A 7A 6D 0D 68 2B 88 50 EB 5A
<00F0>  18 50 0C 76 62 5F 62 BD 3F 0F 6D 8F 8F 7E 10 00
<0100>  5F 00 00 10 04 00 2F 29 32 30 2C 15 5F 13 32 B1
<0110>  F3 5F F3 29 74 78 2F 08 08 46 29 2B 8C 5F A7 53
<0120>  22 68 05 B2 27 68 08 23 30 11 5E 27 28 13 5F BB
<0130>  05 5F 74 53 04 11 11 AE 5F 95 05 22 0E 53 21 00
<0140>  07 00 BB 60 73 75 5F 5F 74 5F 04 A6 72 87 06 93
<0150>  BA 5F 1F AA 37 74 69 96 91 5F 56 54 6C 71 77 A7
<0160>  06 55 05 73 54 7B 57 5F 7D 7B 5F 5F 5F 89 77 05
<0170>  05 55 85 64 C0 71 71 5F 7D 07 5F 64 40 0F 55 00
<0180>  5F 00 00 6E 56 00 0F 75 FC D8 00 6B 74 7C 5F 5F
<0190>  71 6B 7F 7B 00 00 6E 5F 77 0D 5F 6A 65 0E F0 40
<01A0>  0B 5F 93 0E 5F 35 2E 6D 0D C8 00 60 0E 0E 06 1B
<01B0>  6A 5F 60 07 5F 0E 5F 6A 40 5F 63 40 19 77 6A 00
<01C0>  5F 97 71 5F 5F 0C 06 54 96 06 6C 93 77 93 64 26
<01D0>  0D 0E 74 5F 55 05 77 B9 69 8E 56 76 8B A4 5F 1F
<01E0>  09 74 72 A5 56 5F A2 0C 5F 74 8C 5F 06 0D 56 04
<01F0>  10 5F 96 6E 22 67 5F 5F 6E 71 55 17 04 0F 5F 00
<0200>  01 00 00 0D 63 00 22 08 0E 5F 00 0C 7B 5F 5F 05
<0210>  BE 5F 22 74 00 00 63 5F 93 7B 8C 0F 53 93 A8 7C
<0220>  5F 77 04 20 23 68 40 5F 5F 65 00 0F 5F 5F 8C A2
<0230>  01 53 78 08 0F 54 72 5F 5B 20 54 0F 80 55 65 00
<0240>  06 00 00 E7 55 00 6A 92 19 65 00 7A 79 94 55 6A
<0250>  3C 05 5F 79 79 00 05 F2 0D 37 54 5F 64 73 5F 05
<0260>  64 68 93 05 0D CE 61 06 69 5D 98 5F 6A 63 76 5F
<0270>  05 19 6A 64 9E 71 37 68 64 07 5F 04 04 05 64 00
<0280>  60 47 7D E6 04 70 61 7C 6A A9 7A 5F 04 AB 04 1C
<0290>  31 0C 54 FA 22 82 CE 10 37 7A 54 04 31 6E 20 5F
<02A0>  30 60 19 8C 37 6A 7A 7B 5F 5F 55 5F 5F 7A 30 0A
<02B0>  67 6A 5F A8 1A 13 69 24 60 18 54 53 34 B9 5D 00
<02C0>  21 00 00 5F B2 6F B6 B6 20 54 17 90 24 53 2E 69
<02D0>  54 10 14 56 28 5F 75 18 78 93 28 35 5F 68 A0 23
<02E0>  5F 26 22 0D 6E 5F 91 A6 96 95 91 31 37 10 35 A0
<02F0>  1D 04 55 25 7C 5F 5F 69 10 A0 39 A6 70 24 43 00
<0300>  5F 00 00 1D 08 00 7B 68 5F 5F 00 24 86 0A 98 65
<0310>  9D 68 6C 61 86 00 86 A1 6B A6 68 0F 14 56 BE 6C
<0320>  0F 55 6A 63 0F 6A 5F 75 68 0E 00 6B 33 55 54 01
<0330>  0D 86 54 80 62 02 5F 5F 75 5F 86 01 C0 58 7C 00
<0340>  6A 00 00 19 60 00 07 CE 62 5F 00 06 14 A3 7A AF
```

```
 62  <0350>  6A 5F 07 14 7C 00 05 9E 14 20 57 20 3C 07 57 FA
 63  <0360>  37 0F 05 7A 20 64 20 68 37 04 77 5F 20 14 69 7D
 64  <0370>  5F AE 14 6F 5F 75 14 47 7A 68 65 5F 06 63 7A 00
 65  <0380>  5F 00 00 20 6E 00 1D E3 0C 04 0A 02 00 20 61 20
 66  <0390>  6E 60 A2 00 00 00 5F 0F 75 89 61 6C 5F 98 14 20
 67  <03A0>  35 10 5F 60 0F 54 00 10 5F 00 00 6F 2B 07 22 10
 68  <03B0>  20 31 7D 7F 13 5F 07 5F 10 B2 54 09 5F 20 16 00
 69  <03C0>  66 2F 7C 5F 53 10 0C 00 26 28 35 18 EB 15 5F 20
 70  <03D0>  0C 5F 5F 2E 78 5F 35 5F 21 6B 21 80 AF 0F 13 0A
 71  <03E0>  60 26 95 23 54 31 68 11 64 95 37 5F 10 5F 7F 20
 72  <03F0>  34 14 82 20 22 02 70 59 6B 1F 11 11 FC 20 5F 00
 73  <0400>  58 6E 11 68 6E 00 40 40 06 0F 5F 0E 5F 69 77 19
 74  <0410>  6A 6D 60 0E 6D 6E 65 5F 04 06 56 06 6A 6C 68 F5
 75  <0420>  B8 19 5F 5F 5F 5F 79 6A 48 5F 0C 0E 5F 5F 6C 7F
 76  <0430>  5D 60 7B 09 20 6A 79 FD 7F 20 6A 68 00 27 7E 00
 77  <0440>  7F B9 7C 87 19 5F 54 5F 7C 04 05 6C 63 71 B9 56
 78  <0450>  6C 5F 6E 6E 60 6E 5F 7B 91 5F 5F 57 6F 19 7C 5F
 79  <0460>  59 5F B9 7B 54 54 57 6E 55 5F 55 55 5F 91 5F 60
 80  <0470>  5F 54 6E 06 6E 87 72 55 6C 0D 05 AE 56 5F AE 00
 81  <0480>  18 00 00 6E 38 00 5F 34 5F 71 00 5F 20 A1 18 6E
 82  <0490>  6E EE 10 22 27 6E 19 56 2F 1C 70 10 6F 10 59 18
 83  <04A0>  37 10 7F 30 7F 11 15 54 18 11 59 86 5F 6E A1 5F
 84  <04B0>  6E 71 23 97 5F 5F 21 21 20 5F 11 55 10 A7 6E 00
 85  <04C0>  5F 00 00 0C 53 00 71 00 71 28 A5 60 0F 5F 5F 21
 86  <04D0>  B9 5F B9 5F 73 73 5F B9 89 64 05 04 28 93 00 5F
 87  <04E0>  10 0F B9 21 04 00 B9 53 5F 72 80 5F 5F 07 53 60
 88  <04F0>  54 53 07 9C 71 60 71 55 95 6E 54 A8 5F 5F 03 00
 89  <0500>  6B 00 00 68 3F 00 10 0F 7C 18 00 88 54 25 7D 13
 90  <0510>  6B 10 08 78 00 00 10 04 0F 0F 32 08 F3 5F 2F 7D
 91  <0520>  E7 27 B2 88 00 5F B1 2F EE 2C 00 05 0C 29 30 7C
 92  <0530>  B7 5F 5F 15 68 5F 5F 68 68 68 7B 13 37 9F 9F 00
 93  <0540>  5F 00 00 55 7E 84 67 92 79 0D 0F 84 5F 5F 69 5F
 94  <0550>  05 5F 65 57 9B 77 0C 54 64 07 BE 5F 5F A5 8D 1C
 95  <0560>  66 91 40 9B 57 5F 63 74 5F AA 5F 8D 0E 66 77 8F
 96  <0570>  56 5F 84 0C 71 04 84 5F 9C 8D 54 71 06 0E 6B 00
 97  <0580>  2B 00 90 9D 10 7F 57 0E 93 CE 6E 31 7B 63 74 72
 98  <0590>  69 53 76 1A 1B 85 AB 24 55 94 5F AB 67 5F 5F 20
 99  <05A0>  10 5F 28 5F 19 84 FA 57 0E AA 54 77 AD 22 0E 14
100  <05B0>  5F 60 54 9A 28 00 21 27 36 5F AB 7A 2E 80 14 00
101  <05C0>  5F 93 77 6C 72 2E 6A 80 06 5F 77 72 6C 22 77 0C
102  <05D0>  2C 99 82 AA 0F 80 5F 5F 5F 05 56 89 6A 7D 5F 72
103  <05E0>  0D 5F 56 55 0D 0E 54 6A 6A 7B 7F 1C 74 06 6C C0
104  <05F0>  6A 8A 82 56 56 6A 56 20 56 21 5F 6A 69 6C 40 00
105  <0600>  58 00 00 30 7E 00 31 C0 35 0F 00 06 AF 18 68 7E
106  <0610>  04 6B 5F 00 00 00 5F 5F 5F 91 BA 69 68 40 5F 80
107  <0620>  6E 14 C0 6B 68 0F 00 0F 74 00 00 7E 68 84 27 7F
108  <0630>  6B FC 24 68 00 07 0F 00 35 12 7F 53 68 80 24 00
109  <0640>  5F 00 00 6E 69 AB 0F 55 05 5F 79 05 6A 64 67 56
110  <0650>  75 9A CE 5F 05 CE 77 0F 19 0D 0F 37 5F 5F 00 6E
111  <0660>  10 5F 55 89 6C 7A 37 6E 05 78 7A 5F 0D 5F 78 60
112  <0670>  55 05 19 6F 7A 6B 6A 32 8F 0F CE AF 19 7A 56 00
113  <0680>  7D 00 00 10 62 00 21 5F 7A 6A 9D B2 30 A5 06 A5
114  <0690>  07 46 62 5F 18 30 53 21 05 31 04 2F 5F 10 A7 80
115  <06A0>  47 5F 7D 24 E8 6A 10 22 18 07 31 53 88 24 2F 5F
116  <06B0>  5F 04 18 53 32 86 5F 0E 24 B6 30 21 68 53 F0 00
117  <06C0>  5F 00 00 7B 5F 00 05 5F 7C 37 00 05 00 90 84 21
118  <06D0>  7F 10 78 00 00 00 84 9A 88 00 55 68 17 53 14 BD
119  <06E0>  17 36 35 26 48 0C 00 10 15 00 00 04 6B 2E 54 07
120  <06F0>  07 54 00 20 5F 84 EB 74 5F 5F 28 C0 17 5F 57 00
121  <0700>  6B 00 00 8E 88 00 53 16 60 40 00 7C A9 32 5F 14
122  <0710>  04 C0 6B 2F 80 00 92 16 2D 5A 5F 68 6B 20 20 78
123  <0720>  02 5F 7C 10 30 2F 7C 20 04 7B 00 18 6B 2B 5F F3
```

```
124 <0730>  22 7F 50 14 6B 31 35 05 5F 7F 17 07 14 64 10 00
125 <0740>  64 00 00 27 00 00 68 68 00 00 00 7C 00 B7 E8 5F
126 <0750>  2F 00 00 00 00 00 2C 5F 2F 00 7B 07 17 7A 97 18
127 <0760>  07 5F 00 30 00 48 00 04 0F 00 00 16 57 78 20 31
128 <0770>  71 5F 00 04 6B 10 8B 5F 91 6B FC 32 5F 53 16 00
129 <0780>  5F 00 FE BE 0E 75 92 98 6A 66 E5 1C 6B 69 57 05
130 <0790>  79 5F 5F 92 77 75 6B 04 5F 04 BE 91 54 7A 83 67
131 <07A0>  6B 5F 95 07 54 A2 1C BE 0F 5F 0C 6B 6B 06 BA 00
132 <07B0>  56 A1 85 5F 98 1C 56 98 BB 78 5F 64 06 55 5F 00
133 <07C0>  5F 00 00 07 10 00 06 30 58 16 00 17 93 05 31 20
134 <07D0>  7B 1C 5F 65 00 00 73 28 53 58 19 04 B7 18 13 5F
135 <07E0>  01 64 7B 5F 99 20 99 11 93 6E 00 04 92 0C 7F 0C
136 <07F0>  20 32 88 20 5F 05 5F 20 10 17 16 11 78 20 4E 00
137 <0800>  5F 40 76 2B 23 14 14 20 14 14 2B 2B 14 25 14 2E
138 <0810>  25 29 2B 14 14 14 14 26 27 23 14 14 2A 27 14 26
139 <0820>  40 14 14 15 2B 14 2A 14 14 2A 2B 14 14 27 14 14
140 <0830>  27 30 14 27 2F 23 2F 20 14 14 14 14 2D 23 14 00
141 <0840>  07 CE 7D AC 7D 04 54 93 07 F3 05 76 36 64 77 EC
142 <0850>  76 64 76 5F 10 02 8E 5F 8D 7E A3 06 70 0F 7C 0E
143 <0860>  5F 5F CA 56 5F C0 0B 5F 05 31 5F 22 5F 0D 7B 5F
144 <0870>  60 8E 7B 16 5F 55 72 6D 06 10 64 0E 5F 6E 7B 00
145 <0880>  5F 80 7E A3 68 00 54 6F 5F 30 68 53 69 6F 0C 19
146 <0890>  72 6E 32 6E C0 9E 21 6E 57 0C 0D 7C 71 7B 6F 55
147 <08A0>  7C 5F FA 5F 02 23 70 55 57 7B 69 5F 6E 8E 54 6E
148 <08B0>  56 63 05 86 6E 7B 5F 5F 8F 5F 5F 6C 5F 0E 60 00
149 <08C0>  57 00 6E 0F 22 19 63 21 7D 19 1C 97 A9 5F 00 0F
150 <08D0>  5F B2 6E 6F 53 7E 0F 6E 5F 53 07 5F 97 5F 0C B3
151 <08E0>  90 97 53 53 FE 55 79 97 63 28 85 5F 63 72 AB 5F
152 <08F0>  5F 97 24 28 57 72 07 72 00 53 97 07 21 6C 53 00
153 <0900>  18 80 78 64 6F 6F A2 6E AB 6E 54 95 A3 57 56 1B
154 <0910>  6E 57 54 64 AD 64 54 6B 93 56 6E 6E 5F 64 5F 5F
155 <0920>  5A 57 64 6C 82 64 82 6B 6C 55 68 6F 6E B2 C0 79 6E 80 00
156 <0930>  BC 55 64 C0 56 30 55 55 68 6F 6E B2 C0 79 6E 80 00
157 <0940>  5F 00 00 7E 16 00 07 FB 20 5F 00 14 20 75 78 83
158 <0950>  5F 1C 10 5F 04 A1 20 A6 6E 35 5F 5F 9A A3 57 10
159 <0960>  03 9F 20 60 10 20 10 5F 19 2A 77 7B 6A 09 69 7C
160 <0970>  18 30 5F 63 18 00 25 98 31 57 3F 5F 30 75 13 00
161 <0980>  10 00 00 87 AF 00 53 23 B2 A2 A0 BD 93 22 BD 21
162 <0990>  1C 53 53 27 95 07 00 5F 6B 53 BD 5F 1C 0C A3 97
163 <09A0>  20 6B 25 53 97 26 B4 53 9B 53 9B 6B 1C 7A AF 5F
164 <09B0>  53 A5 24 8D 5F 0E B4 6B 8F 6B 6A 0C 6B 77 1C 00
165 <09C0>  0F 00 00 40 6A 74 7B 3C 6C 77 7F 89 7D 04 77 06
166 <09D0>  05 04 69 5F 54 04 57 68 54 A5 26 7F 61 13 07 34
167 <09E0>  5F 5F 6C 5F 57 77 AE 5F 20 1A 6E 10 6E 65 BF 1B
168 <09F0>  1D 04 8C 6B 11 5F 04 5F 72 0D 20 07 00 10 5F 00
169 <0A00>  5F 00 00 56 6A 00 71 5F 73 0E 2B 06 5F 5F 37 5F
170 <0A10>  06 5F 19 78 7D 79 8C 68 7A CE 9E 64 6A 6A 6E 6C
171 <0A20>  2C B6 37 62 06 6C 66 60 19 F5 47 3C FA 56 DE 15
172 <0A30>  18 05 7A 55 64 69 5F 18 6C 95 0D 6C 17 10 18 00
173 <0A40>  5F 3B 7D 19 5F DD 05 CE 8A 9E 79 68 6A A3 7A 5F
174 <0A50>  6A 54 69 5F 04 FA F0 0B 5F 0C 55 82 31 05 04 6E
175 <0A60>  12 0D 74 7A 04 3C 37 69 37 64 7A 5F 72 6B 7A 5F
176 <0A70>  20 29 19 0C 5F 7A 57 78 1C 7A 6A 54 20 AE 1C 00
177 <0A80>  14 00 00 0F CE 00 67 5F 57 7A 00 5F 0F 5F CE 14
178 <0A90>  37 7A 07 DF CF 00 37 77 A2 19 07 0F D0 7A 2F 14
179 <0AA0>  25 6A 5F 79 A9 69 7A 20 5F 7A 00 57 07 6A 5F 2F
180 <0AB0>  14 57 07 10 67 87 19 14 29 79 07 20 14 14 20 00
181 <0AC0>  01 00 75 0E 04 64 62 9B 55 A1 04 84 77 5F 56 30
182 <0AD0>  93 60 0C 04 19 06 56 63 62 69 0E 5F 48 74 31 74
183 <0AE0>  5F 77 5F 06 8C 06 6A 7B 54 05 07 5F 0E 62 77 40
184 <0AF0>  01 5F 77 74 AE 74 A1 5F 5B 7C 5F 35 B9 18 65 00
185 <0B00>  21 00 00 20 8B 00 B4 10 93 13 00 7C 7F 53 20 75
```

```
186 <0B10> 75 E7 68 5F 0C 1F 8B 10 6B 8C 24 68 9A 6E 10 9F
187 <0B20> 53 10 6B 77 68 6E 74 07 BB 1A 7A 75 E7 37 20 22
188 <0B30> AF 6A 37 23 25 11 92 53 20 53 53 B3 10 20 7E 00
189 <0B40> 6A 6F 6E 5F 91 5A 87 5F B2 58 18 9A 60 54 69 1E
190 <0B50> 07 58 6A 07 00 09 A5 22 6C 5F 64 9D C6 77 5F 65
191 <0B60> C8 64 89 72 91 77 04 25 6C 73 5F 55 54 56 5F 5F
192 <0B70> AF 05 65 10 57 AD A5 7C 04 7B A5 05 05 6F 7A 00
193 <0B80> 68 00 00 07 0F 00 BA 8B 0C 73 00 75 5F 57 54 73
194 <0B90> 75 65 5F 0C 79 6E 9E 05 1C 0C 77 92 55 66 5F 5F
195 <0BA0> 7E 5F 5F 04 5F 40 68 0D 0F 5F 0C 9E A1 A1 B5 64
196 <0BB0> 6A 6B 76 B4 8B 5F 69 56 62 64 5F B9 7D 06 80 00
197 <0BC0> 5F 18 7D 76 5F 20 10 65 6E 9B 14 77 20 20 5F 0E
198 <0BD0> 5F 56 84 20 20 20 5F 5F 5F 71 11 76 69 6E 74 64
199 <0BE0> 09 79 6B 55 98 54 14 97 22 14 14 05 25 5E 0E 54
200 <0BF0> 20 96 5F 0C 55 20 0C B3 10 5F 8E 04 77 5F 93 00
201 <0C00> 74 E8 72 29 57 0D 5F 98 6D 63 6D FA D7 30 53 71
202 <0C10> 5F 5F 5F 7C 95 5F 68 B5 18 71 3F 10 23 01 CE 5F
203 <0C20> 9F 10 99 20 55 6E 5F C0 24 54 99 86 31 6E 53 0E
204 <0C30> 54 A1 A6 5F 6F 1B 30 72 8F 0E 5F 96 55 72 BD 00
205 <0C40> 5F 00 00 56 55 00 19 53 5F 6C 00 54 97 6E 21 55
206 <0C50> 97 97 5F 6C BA 3D 71 5F DA A6 10 6E 56 E8 60 DA
207 <0C60> 07 A8 88 AA 7B 97 5F 97 19 0D 72 08 68 5F 86 68
208 <0C70> 20 6A 55 5F 0E 20 FA FA 53 7C 72 6E 8E 5F 6A 00
209 <0C80> 5F 00 00 53 24 00 21 0E 5F 5F 00 6A A9 0E 5F 21
210 <0C90> 6E 6E 6E 6E F3 00 6E 64 22 3F 5F 68 30 6E 76 19
211 <0CA0> 1D 22 0D 21 29 80 10 74 5F 70 00 B9 31 FA 30 77
212 <0CB0> 18 53 18 FC 24 6E 30 77 5A 30 0C 74 AF F5 68 00
213 <0CC0> 74 00 00 02 6A 00 6B A8 08 24 6E 0F 0F B4 62 6E
214 <0CD0> 0A 5F 6E 94 5F 0E 5F AC 68 5F 54 6B A8 68 9F 20
215 <0CE0> 8D 68 6C 56 6A 55 54 7D 6E 6E 61 5F 63 33 75 59
216 <0CF0> 7E 9B 68 AA 55 14 AB 11 92 7B A3 20 5F 15 60 00
217 <0D00> 68 C7 7A 6E 6E 47 A1 6E B2 A2 7D 5F 6F 56 A3 00
218 <0D10> 54 57 55 6C 8A 82 6E 0D B6 57 68 56 5F 54 66 0C
219 <0D20> 0A 19 19 19 6E 69 6E 5F BA AA 0B 6E 6E 8B 79 5F
220 <0D30> 7C 55 64 68 6E 5F 6C 64 40 0D 6C 0D 5F 5F 72 00
221 <0D40> 5F A3 77 A5 04 80 0C A5 5F 06 76 0F FB 78 54 54
222 <0D50> 69 04 6B 5F 18 30 7A 68 63 6A 5F 9A 9A 6B 71 7A
223 <0D60> 6B 5F 6C 04 7A 5F 82 A1 0D 34 31 0E 57 5F 5F 55
224 <0D70> 05 5F 05 69 A5 A5 AD BA 7B 92 5F 05 78 5F 5F 00
225 <0D80> 5F 00 00 54 6E 00 1B 05 76 04 00 13 02 A9 5F 75
226 <0D90> 6F 5E A2 6E 7D 00 20 86 31 5F 55 56 54 6F 76 76
227 <0DA0> 69 6E 76 11 54 54 55 3E 1B 05 EC 5F 30 88 A8 0D
228 <0DB0> 56 18 07 5F 55 33 10 77 BD 03 6E 93 06 5F 5F 00
229 <0DC0> 76 00 D0 50 A6 79 97 1B 19 0D AA 10 6F 14 A2 B4
230 <0DD0> 97 AA 60 E5 19 5A 20 2F 79 79 2F 5F 5F 56 55 35
231 <0DE0> 00 5A 55 57 56 5F 7B 19 BE 68 50 59 C0 31 60 18
232 <0DF0> 58 B6 AA 55 7F 11 0F 5A BE B4 00 9E B4 BE 6B 00
233 <0E00> 57 00 00 0E CE 00 19 5F 56 7A 00 5F 7A 06 FA 7F
234 <0E10> 37 68 06 7D 7A 00 37 7C A2 5F 87 0E 20 7A 10 73
235 <0E20> 9F 6A 5F 68 94 78 0E C0 5F 00 29 2F 06 6A 10 5F
236 <0E30> 5F 56 06 5F 76 56 19 21 16 16 06 5F 20 19 10 00
237 <0E40> 20 00 00 7A 5F AF 0F 54 8A CE 79 75 6A 7D 66 6A
238 <0E50> 6B 54 7A 5F 04 FA 5F 2B 5F 0C 5F 6A 6C 5F 1B 56
239 <0E60> 6A C0 77 84 04 04 37 56 35 67 7A 6A 75 37 5F 21
240 <0E70> 6C 04 19 22 7F 56 0C 6A 5F 6A DA 6C 0B 5F 6A 00
241 <0E80> 61 D3 74 8E 13 0B 07 5F A6 20 18 29 47 7B 20 5F
242 <0E90> 29 53 A6 31 10 2E 11 0F 6C 7D 5F A6 04 87 8E 6A
243 <0EA0> 00 7A 29 2E 20 53 18 6B 29 30 5F 6A 29 20 19 37
244 <0EB0> 68 1E 10 54 87 37 53 5F 10 A1 22 6A 74 07 00 00
245 <0EC0> 5F 00 EA 0D 10 77 5F AD 55 68 A6 A3 A9 BE 55 54
246 <0ED0> 10 EA 78 6F 0B 85 9B 9A 5F 56 23 6A 64 22 71 31
247 <0EE0> 60 29 77 7F A9 61 79 9C 74 76 56 22 25 56 57 10
248 <0EF0> 55 9F 19 21 43 BE 76 72 BD BE 5F AA 20 5F 5F 00
```

```
249 <0F00> 5F 00 00 54 64 00 0F 5F 04 07 79 64 64 5F C8 5F
250 <0F10> 68 64 64 64 05 63 04 5F 90 06 68 05 6A 7E 0E 8F
251 <0F20> 22 87 06 61 07 07 07 7C 30 04 5F 08 5F 64 6C 70
252 <0F30> 57 0E 64 0F 5F 6A 71 47 AF 24 70 5F 07 60 78 00
253 <0F40> 69 10 70 18 32 9A 1C 02 32 60 61 D6 94 BA 5F 6E
254 <0F50> BA 60 31 94 65 00 61 5F 9E 30 34 54 97 6E 10 13
255 <0F60> A6 31 30 0D 91 60 58 0C 79 AC 7E 12 5F A6 6E 54
256 <0F70> 22 71 60 BD 6F 18 13 A7 78 58 10 04 20 5F 5F 00
257 <0F80> 55 FB 7C BA 63 10 53 5F 0F 5F 6F 72 1A 20 B6 97
258 <0F90> 60 6E 91 01 31 79 5F 7C 0F 68 31 53 0F 53 53 87
259 <0FA0> 97 5F 0F 71 68 0F 5F 20 0D 18 85 FB 91 89 04 97
260 <0FB0> 5F 0C 1A 10 91 5F 22 31 08 5F 21 10 18 2A 5A 00
261 <0FC0> 5F 00 00 68 94 00 B4 10 94 55 00 0B 5A 2B 5F 0F
262 <0FD0> 79 55 10 76 76 00 76 CF 68 50 68 68 79 30 74 60
263 <0FE0> 13 39 19 22 68 5F 99 5F D0 0F 04 70 2B 39 61 31
264 <0FF0> 54 DD 88 76 68 10 A5 78 B7 79 40 00 61 5F CA 00
265 *-----------------------------------------------------------*
266 *                          music                            *
267 *                ROM addr 0000H thru 00FFH                  *
268 *-----------------------------------------------------------*
269 * addr   0  1  2  3  4  5  6  7  8  9  A  B  C  D  E  F     *
270 *-----------------------------------------------------------*
271 <0000> 00 3A 3C 23 25 23 25 27 2A 26 27 2A 2C 2A 15 13
272 <0010> 2C 00 3A 3A 3A 3A 3A 3A 3A 3A 3A 3A 01 00 25 23
273 <0020> 23 22 3C 3C 3C 3C 3C 3C 3C 3C 3C 3C 3C 3C 3C 3C
274 <0030> 3C 3C 01 00 3A 3A 3A 3A 38 38 38 38 2B 2B 2B 2B
275 <0040> 00 25 00 23 3C 3A 3A 3A 3A 3A 3A 3A 3A 3A 3A 3A
276 <0050> 3A 3A 3A 01 25 25 25 25 25 25 25 25 37 37 37 37
277 <0060> 37 37 37 37 00 39 39 39 39 39 39 39 3C 3C 3C
278 <0070> 3C 3C 3C 3C 3C 00 00 01 27 27 27 27 22 22 22 22
279 <0080> 23 23 23 23 27 27 27 27 00 25 25 25 25 25 25 22
280 <0090> 22 3C 3C 3C 3C 3C 3C 3C 3C 01 25 25 25 25 00 27
281 <00A0> 25 23 25 25 25 27 27 27 29 00 29 29 22 3C 3A 3A
282 <00B0> 3A 3A 3A 3A 27 27 27 27 27 27 01 00 00 25 01 00
283 <00C0> 23 00 23 00 23 00 23 00 23 01 00 17 00 17 01 00
284 <00D0> 1D 1D 00 1D 1D 01 00 1A 00 1A 00 1A 00 1A 00 1A
285 <00E0> 00 1A 01 3A 01 01 2B 00 2B 01 2B 00 01 FF FF FF
286 <00F0> FF FF FF FF FF FF FF FF FF FF FF FF FF FF FF FF
```

What is claimed is:

1. A hand-held electronic game comprising:

a plurality of manually operable control switches for permitting control of the play of the game by a player;

sound transducer means for generating sound responsive to sound signals;

control circuit means coupled to the control switches and the sound transducer means, and including a processor, a read-only memory, and a random access memory, for generating game control signals and sound signals;

display means having selectively activatable image segments corresponding to player-controlled figures which comprise a solder image, game-controlled figures which comprise alien soldier images and alien creature images and a sequence of missile images having a simulated flight path and fired in a pattern substantially unknown to the player, and a plurality of wall image segments which are sequentially displayed to simulate depth and movement of player-controlled figures, and alpha-numeric game information for selective display thereof, said display means for display of games images responsive to the game control signals such that the player-controlled figure is visually displayed at one of a plurality of pre-determined positions and the position at which the player-controlled figure is displayed is moveable to an adjacent position responsive to player activation of a control switch, and a plurality of game-controlled figures are sequentially visually displayed in pseudo-random sequences to give the appearance of a random pattern of attack by the game-controlled figures toward the player-controlled figure; and the game-controlled figures including a plurality of targets and protective shutters, and the processor including means for controlling display of explosion image segments to simulate destruction of the targets and the protective shutters responsive to a plurality of simulated collisions of bullets into the targets and the protective shutters, and means for increasing the score in response to simulated destruction of a shutter and in response to simulated destruction of a target, and the processor includes means for displaying simulated firing of bullets by the player-controlled figure and for selective display of simulated hits of alien soldiers and creatures by the bullets responsive to activation by the player of a firing control switch, and for display explosion image segments responsive to a simulated hit, and for accumulating a score responsive to simulated hits.

* * * * *